(12) United States Patent
Wang (10) Patent No.: US 11,763,712 B2
(45) Date of Patent: Sep. 19, 2023

(54) FLEXIBLE DISPLAY MODULE AND DISPLAY DEVICE

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 249 days.

(21) Appl. No.: 17/266,642

(22) PCT Filed: Nov. 30, 2020

(86) PCT No.: PCT/CN2020/132837
§ 371 (c)(1),
(2) Date: Feb. 8, 2021

(87) PCT Pub. No.: WO2022/099818
PCT Pub. Date: May 19, 2022

(65) Prior Publication Data
US 2023/0016636 A1     Jan. 19, 2023

(30) Foreign Application Priority Data

Nov. 13, 2020 (CN) .......................... 202011268583.8

(51) Int. Cl.
*G09G 3/00* (2006.01)
*G06F 1/16* (2006.01)

(52) U.S. Cl.
CPC ........... *G09G 3/035* (2020.08); *G06F 1/1652* (2013.01); *G09G 2300/0426* (2013.01); *G09G 2300/0439* (2013.01)

(58) Field of Classification Search
CPC ....................................... G09G 3/30
USPC .................. 345/173, 690; 362/183
See application file for complete search history.

(56) References Cited

U.S. PATENT DOCUMENTS

| | | |
|---|---|---|
| 10,608,206 B2* | 3/2020 | Peng .................... H01L 51/0097 |
| 2015/0233557 A1* | 8/2015 | Aoyama .................... F21S 4/22 362/183 |
| 2015/0261333 A1* | 9/2015 | Kaneyasu ............. G06F 3/0445 345/173 |
| 2017/0153513 A1* | 6/2017 | Tamaki ................ G09G 3/2003 |
| 2020/0168670 A1* | 5/2020 | Kim .................... H10K 59/1213 |
| 2020/0212117 A1* | 7/2020 | Jeon ........................ H01L 27/3218 |
| 2020/0243778 A1* | 7/2020 | Li ........................ H10K 77/111 |

* cited by examiner

*Primary Examiner* — Prabodh M Dharia (57) ABSTRACT

The present application provides a flexible display module. A display area of the flexible display module comprises a plurality of island-shaped structures separated from each other. A bending structure including at least three bending portions is provided to connect the island-shaped structures, which effectively realizes stretching of the flexible display module in three directions of space. At the same time, since the bending structure is connected to one end of one side of the adjacent island-shaped structures, it increases a bending length of the bending structure and a bending space of the flexible display module. The present application also provides a display device comprising the flexible display module.

19 Claims, 7 Drawing Sheets

FLEXIBLE DISPLAY MODULE AND DISPLAY DEVICE

RELATED APPLICATIONS

This application is a National Phase of PCT Patent Application No. PCT/CN2020/132837 having International filing date of Nov. 30, 2020, which claims the benefit of priority of Chinese Patent Application No. 202011268583.8 filed on Nov. 13, 2020. The contents of the above applications are all incorporated by reference as if fully set forth herein in their entirety.

FIELD AND BACKGROUND OF THE INVENTION

The present application relates to a field of display, and particularly to a flexible display module and a display device.

With development of new display technologies, various types of flexible small and medium-sized tablet computers and mobile phone display devices have entered a commercial stage, for example, terminal display products such as foldable and rollable mobile phones and tablet computers. However, display modules of the display products only partially realize functional characteristics of flexible display, sizes of the display devices have not changed, and they can only realize changes of display shapes and display states in terms of space, which cannot meet requirements of diverse occasions and complex environments. In particular, flat display is no longer required of display modules in fields of vehicle display, medical equipment, and wearable display equipment, etc., so products having more complex structures and displaying in forms of complex curved surfaces are gradually emerging. Therefore, display modules are required to have a good stretchability and a characteristic of good malleability, i.e., after the display modules are stretched for a certain extent, display layers of the display modules can normally emit light without affecting normal display or viewing experience.

Therefore, display modules that can be stretched flexibly and freely is an urgent demand of a new generation of display technology and also a key research direction for expanding and innovating flexible display technology.

SUMMARY OF THE INVENTION

Embodiments of the present application provide a flexible display module and a display device, which are used to alleviate a phenomenon that existing flexible display modules have low stretching degree and a poor stretching effect.

On the one hand, the present application provides a flexible display module, wherein a display area of the flexible display module comprises:

a plurality of island-shaped structures, wherein each of the island-shaped structures is provided with a pixel unit, and the plurality of island-shaped structures are separated from each other and arranged in a matrix; and a plurality of bending structures, wherein each of the bending structures comprises a plurality of metal lines electrically connected to the pixel unit, and the plurality of bending structures connect adjacent island-shaped structures;

wherein a first bending structure of the plurality of bending structures comprises at least three bending portions, the first bending structure comprises at least two bending directions, and one end of the first bending structure connected to each of the adjacent island-shaped structures is disposed on one end of one side of corresponding island-shaped structures.

In some embodiments, the three bending portions are a first bending portion, a second bending portion, and a third bending portion; one end of the first bending portion is connected to a first island-shaped structure electrically; another end of the first bending portion is electrically connected to one end of the second bending portion; another end of the second bending portion is electrically connected to one end of the third bending portion; another end of the third bending portion is electrically connected to a second island-shaped structure; and the first island-shaped structure is adjacent to the second island-shaped structure;

wherein a bending direction of the first bending portion and a bending direction of the second bending portion are different.

In some embodiments, the bending direction of the first bending portion is opposite to the bending direction of the second bending portion.

In some embodiments, a curvature of the first bending portion is same as a curvature of the second bending portion.

In some embodiments, the first bending portion and the third bending portion are symmetrical along a symmetry axis of the first bending structure.

In some embodiments, the first bending portion and each of the adjacent island-shaped structure are connected by a first chamfer and a second chamfer, and a curvature of an inner edge of the first chamfer and a curvature of an inner edge of the second chamfer are the same.

In some embodiments, each of the island-shaped structures comprises a first side, a second side, a third side, and a fourth side, wherein the first side and the second side are oppositely arranged, and the third side and the fourth side are oppositely arranged;

the first bending structure is connected to the first side of each of the adjacent island-shaped structures by a first connecting portion, the plurality of bending structures further comprise a second bending structure, and the second bending structure is connected to the second side of each of the adjacent island-shaped structures by a second connecting portion; and the first connecting portion is disposed at one end of the first side close to the third side, and the second connecting portion is disposed at one end of the second side close to the fourth side.

In some embodiments, the plurality of bending structures further comprise a third bending structure and a fourth bending structure, and the third bending structure is connected to the third side by a third connecting portion, the fourth bending structure is connected to the fourth side by a fourth connecting portion, the third connecting portion is disposed at one end of the third side away from the first side, and a fourth connecting portion is disposed at one end of the fourth side away from the second side.

In some embodiments, the first side, the second side, the third side, and the fourth side of each of the island-shaped structures form a square; and the first bending structure, the second bending structure, the third bending structure, and the fourth bending structure are disposed symmetrically around a center of the square.

In some embodiments, the first bending portion of the first bending structure is away from one end of the first side close to the third side, and the second bending portion of the first bending structure is close to one end of the first side close to the third side.

In some embodiments, the first connecting portion comprises a first chamfer and a second chamfer that are disposed oppositely, and a curvature of the first chamfer is same as a curvature of the second chamfer.

In some embodiments, the pixel unit comprises a first color sub-pixel, a second color sub-pixel, and a third color sub-pixel, and an area of the third color sub-pixel is larger than that of a sum of an area of the first color sub-pixel and an area of the second color sub-pixel.

In some embodiments, the pixel unit comprises a first sub-pixel, a second sub-pixel, a third sub-pixel, and a fourth sub-pixel, and the first sub-pixel corresponds to the first color sub-pixel, the second sub-pixel corresponds to the second color sub-pixel, and the third sub-pixel and the fourth sub-pixel correspond to the third color sub-pixel.

In some embodiments, the metal lines comprise at least data lines, gate lines, driving voltage lines, and voltage transmission lines.

In some embodiments, each of the bending structures comprises:
- a first flexible substrate;
- a buffer layer disposed on one side of the first flexible substrate;
- a second flexible substrate disposed on one side of the buffer layer away from the first flexible substrate;
- a first packaging layer disposed on one side of the second flexible substrate away from the buffer layer;
- a wiring substrate disposed on one side of the first packaging layer away from the second flexible substrate;
- a spacer disposed on one side of the wiring substrate away from the first packaging layer; and
- a second packaging layer disposed on one side of the spacer away from the wiring substrate;
- wherein at least four of the metal lines are provided within the wiring substrate, and the at least four metal lines are arranged in parallel and equidistantly.

On the other hand, the present application also provides a display device, wherein a display area of the flexible display module comprises:
- a plurality of island-shaped structures, wherein each of the island-shaped structures is provided with a pixel unit, and the plurality of island-shaped structures are separated from each other and arranged in a matrix; and
- a plurality of bending structures, wherein each of the bending structures comprises a plurality of metal lines electrically connected to the pixel unit, and the plurality of bending structures connect the adjacent island-shaped structures;
- wherein a first bending structure of the plurality of bending structures comprises at least three bending portions, the first bending structure comprises at least two bending directions, and one end of the first bending structure connected to each of the adjacent island-shaped structures is disposed on one end of one side of corresponding island-shaped structures.

In some embodiments, the three bending portions are a first bending portion, a second bending portion, and a third bending portion; and one end of the first bending portion is connected to a first island-shaped structure electrically; another end of the first bending portion is electrically connected to one end of the second bending portion; another end of the second bending portion is electrically connected to one end of the third bending portion; another end of the third bending portion is electrically connected to a second island-shaped structure; and the first island-shaped structure is adjacent to the second island-shaped structure; wherein a bending direction of the first bending portion and a bending direction of the second bending portion are different.

In some embodiments, each of the island-shaped structures comprises a first side, a second side, a third side, and a fourth side, wherein the first side and the second side are oppositely arranged, and the third side and the fourth side are oppositely arranged;
- the first bending structure is connected to the first side of each of the adjacent island-shaped structures by a first connecting portion, the plurality of bending structures further comprise a second bending structure, and the second bending structure is connected to the second side of each of the adjacent island-shaped structures by a second connecting portion; and
- the first connecting portion is disposed at one end of the first side close to the third side, and the second connecting portion is disposed at one end of the second side close to the fourth side.

In some embodiments, the plurality of bending structures further comprise a third bending structure and a fourth bending structure, the third bending structure is connected to the third side by a third connecting portion, the fourth bending structure is connected to the fourth side by a fourth connecting portion, the third connecting portion is disposed at one end of the third side away from the first side, and the fourth connecting portion is disposed at one end of the fourth side away from the second side.

In some embodiments, the first side, the second side, the third side, and the fourth side of each of the island-shaped structures form a square, and the first bending structure, the second bending structure, the third bending structure, and the fourth bending structure are disposed symmetrically around a center of the square.

In some embodiments, the first bending portion of the first bending structure is away from one end of the first side close to the third side, and the second bending portion of the first bending structure is close to one end of the first side close to the third side.

The present application provides the flexible display module and the display device. The display area of the flexible display module comprises the plurality of island-shaped structures separated from each other and the plurality of bending structures connecting the adjacent island-shaped structures, wherein each of the island-shaped structures encapsulates the pixel unit, the plurality of bending structures comprise electrically connected the plurality of metal lines, the first bending structure of the plurality of bending structures comprises at least three bending portions, and the three bending portions comprise at least two bending directions. The present application effectively realizes a stretching of the flexible display module in three directions of space by arranging the first bending structure comprising the three bending portions to connect the corresponding island-shaped structures, and at the same time, resistances of the metal lines are not changed within a preset stretching range. The present application also provides the display device which comprises the flexible display module.

BRIEF DESCRIPTION OF THE SEVERAL VIEWS OF THE DRAWINGS

Following detailed descriptions of specific implementations of the present application in conjunction with accompanying drawings will make technical solutions and other beneficial effects of the present application obvious.

DESCRIPTION OF SPECIFIC EMBODIMENTS OF THE INVENTION

Technical solutions in embodiments of the present application will be described clearly and completely combined with accompanying drawings. Obviously, embodiments described below are only a part of the embodiments of the present application, rather than all the embodiments. Based on the embodiments in the present application, all other embodiments obtained by those skilled in the art without creative work shall fall a protection scope of the present application.

In descriptions of the present application, it can be understood that orientation or location relationships indicated by terms "center", "longitudinal", "transverse", "length", "width", "thickness", "upper", "lower", "front", "back", "left", "right", "vertical", "horizontal", "top", "bottom", "inner", "outer", "clockwise" and "counterclockwise" are based on orientation or location relationships shown in the drawings, which is only for the convenience of describing the present application and simplifying description, rather than indicating or implying that a device or an element referred must have a specific orientation, be constructed and operated in a specific orientation, so it cannot be understood as a limitation to the present application. In addition, terms "first" and "second" are only used for descriptive purpose, and cannot be understood as indicating or implying relative importance or implicitly indicating numbers of a technical feature indicated. Therefore, features defined with the "first" or the "second" can comprise one or more of the features explicitly or implicitly. In the descriptions of the present application, a term "a plurality of" means two or more than two, unless otherwise specifically defined.

In the descriptions of the present application, it should be noted that, unless clearly specified and limited otherwise, terms "installation", "connection" and "connection" should be understood in a broad sense, for example, it can be a fixed connection, a detachable connection, or an integral connection; it can be a mechanical connection, an electrical connection, or communicate with each other; it can be directly connected, indirectly connected through an intermediate medium, or an internal communication of two components or an interaction of two components relationship. For those skilled in the art, specific meanings of the above-mentioned terms in the present application can be understood according to specific circumstances.

In the present application, unless expressly stipulated and defined otherwise, a first feature being "on" or "under" a second feature may comprise a direct contact between the first feature and the second feature, or it can also comprise that the first feature and the second feature are not in the direct contact but in contact with another feature between them. Moreover, the first feature being "on" a second feature means that the first feature directly above or obliquely above the second feature, or it simply means that the first feature is higher than the second feature in a horizontal direction. The first feature being "under" a second feature means that the first feature directly under or obliquely under the second feature, or it simply means that the first feature is lower than the second feature in a horizontal direction.

A following disclosure provides many different embodiments or examples for realizing different structures of the present application. In order to simplify the disclosure of the present application, components and arrangements of specific examples are described below. Of course, they are only examples and are not intended to limit the present application. In addition, the present application can repeat reference numbers and/or reference letters in different examples, and repetition is only for the purpose of simplification and clarity, and does not indicate a relationship between the various embodiments and/or arrangements discussed. In addition, the present application provides examples of various specific processes and materials, but those skilled in the art should be aware of applications of other processes and/or uses of other materials.

In particular, throughout this specification, a planar schematic diagram can be a surface schematic diagram parallel to two directions (for example, a direction DR1 and a direction DR2) crossing each other, and a cross-sectional schematic diagram can be a surface schematic diagram in a direction DR3 perpendicular to a surface parallel to the direction DR1 and the direction DR2. In addition, an overlapping of two constituent elements means that the two constituent elements overlap in the direction DR3 (for example, in a vertical base direction). A flexible display module provided in the present application can be stretched in the direction DR1, the direction DR2, and the direction DR3.

Figure 1:
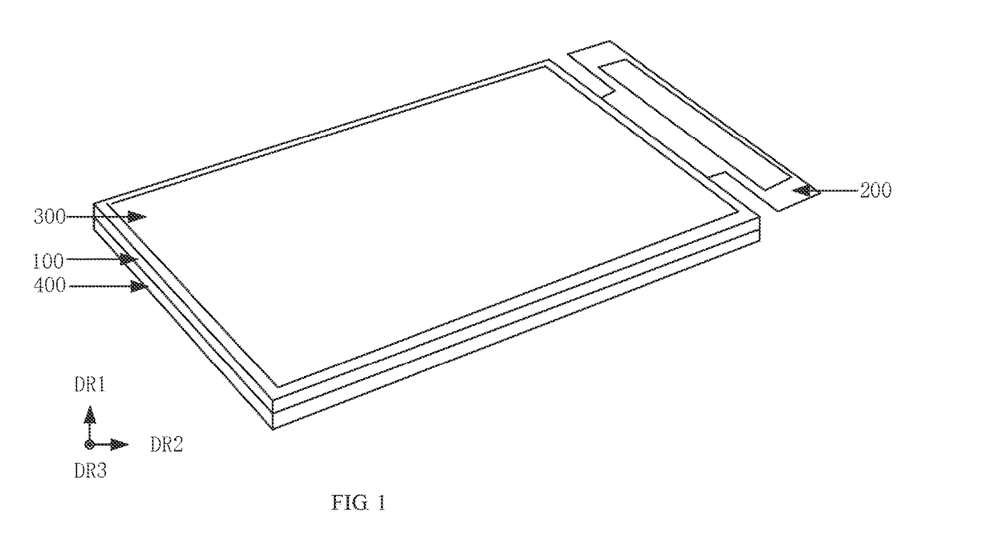
FIG. 1 is a schematic diagram of a flexible display module in an embodiment of the present application.
Figure 2:
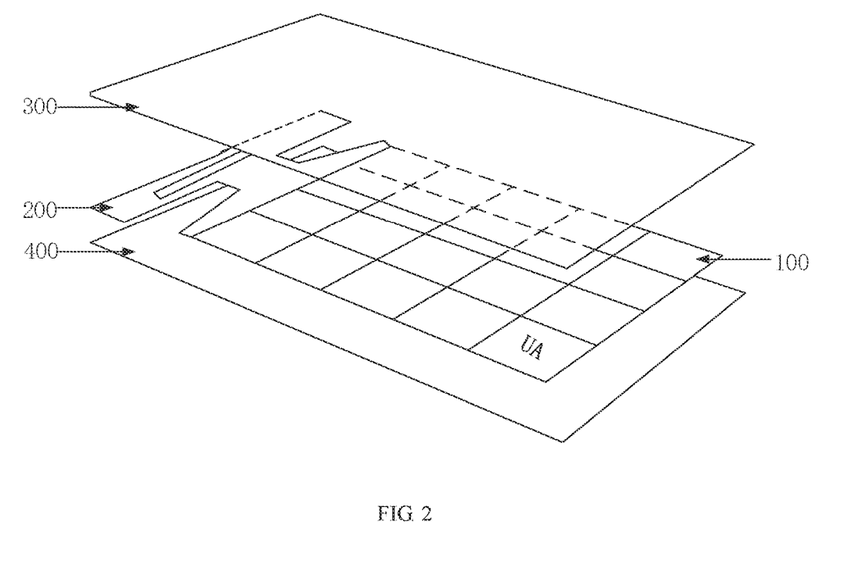
FIG. 2 is an exploded schematic diagram of the flexible display module in an embodiment of the present application.

FIG. 1 is a schematic diagram of the flexible display module of the present application, and FIG. 2 is an exploded schematic diagram of the flexible display module of the present application. As shown in FIG. 1 and FIG. 2, the flexible display module comprises an organic light-emitting diode (OLED) display device layer 100, a driving circuit board 200 connected to the OLED display device layer 100, a cover plate 300 disposed on one side of the OLED display device layer 100, and a flexible substrate 400 disposed on the other side of the OLED display device layer 100. The OLED display device layer 100 comprises a display area and a non-display area. A plurality of unit structures UA are arranged in the display area, and the plurality of unit structures UA are distributed in a matrix in the display area.

Figure 3:
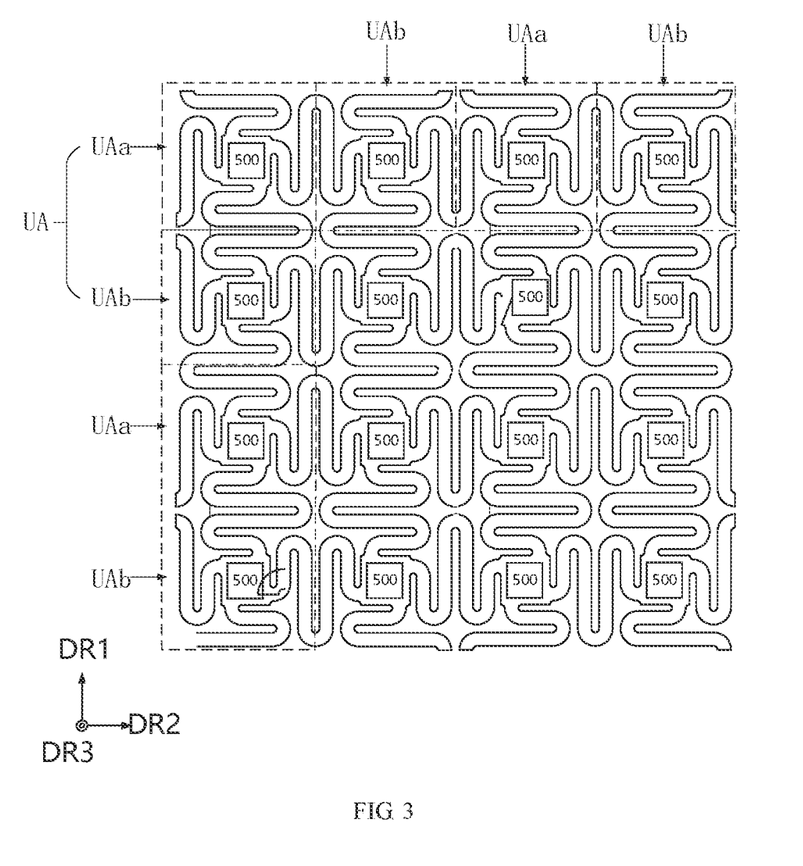
FIG. 3 is a planar layout schematic diagram of a display area of the flexible display module in an embodiment of the present application.

As shown in FIG. 3, a plurality of unit structures UA comprise a plurality of unit areas UAa and a plurality of unit areas UAb adjacent to each other in the direction DR1 and the direction DR2, and the unit areas UAa and the unit areas UAb are alternately distributed. Each two adjacent unit areas UAa and UAb comprise an island-shaped structure 500, and the adjacent unit area UAa and the unit area UAb are connected by a first bending structure 600. The island-shaped structure 500 encapsulates a pixel unit, and the first bending structure 600 comprises a plurality of metal lines electrically connected to the pixel unit. The stretchable first bending structure 600 is located between the two adjacent island-shaped structure 500 and takes a geometric center of the island-shaped structure 500 as a center of symmetry. Four first bending structure 600 are symmetrically distributed in bridge connection around the island-shaped structure 500 and are interconnected with the adjacent island-shaped structure 500, and a plurality of the first bending structures 600 are arranged regularly and periodically in the direction DR1 and the direction DR2 respectively. In a thickness direction, hollow structures exist between one wire and another wire of the first bending structure 600 and between wires of the first bending structure and a main structure 600 of the island-shaped structure 500, wherein middle of the hollow structures are gaps, so that a screen module can reserve sufficient deformable space in the direction DR1 and the direction DR2 as shown in FIG. 3. In addition, display units of the plurality of island-shaped structures 500 and the wires of the first bending structure 600 are arranged symmetrically and periodically, which is convenient for the whole screen module to be more uniform and coordinated when stretching and deforming at the same time in a transverse direction and a longitudinal direction, so as to avoid a local stress concentration, thereby reducing a risk of fracture of a wiring layer due to excessive stretching.

In some embodiments, the plurality of island-shaped structures 500 are arranged in a matrix in a display area of the flexible display module, and a planar shape of the island-shaped structure 500 can be one of polygon, ellipse, triangle, or circle.

Figure 4:
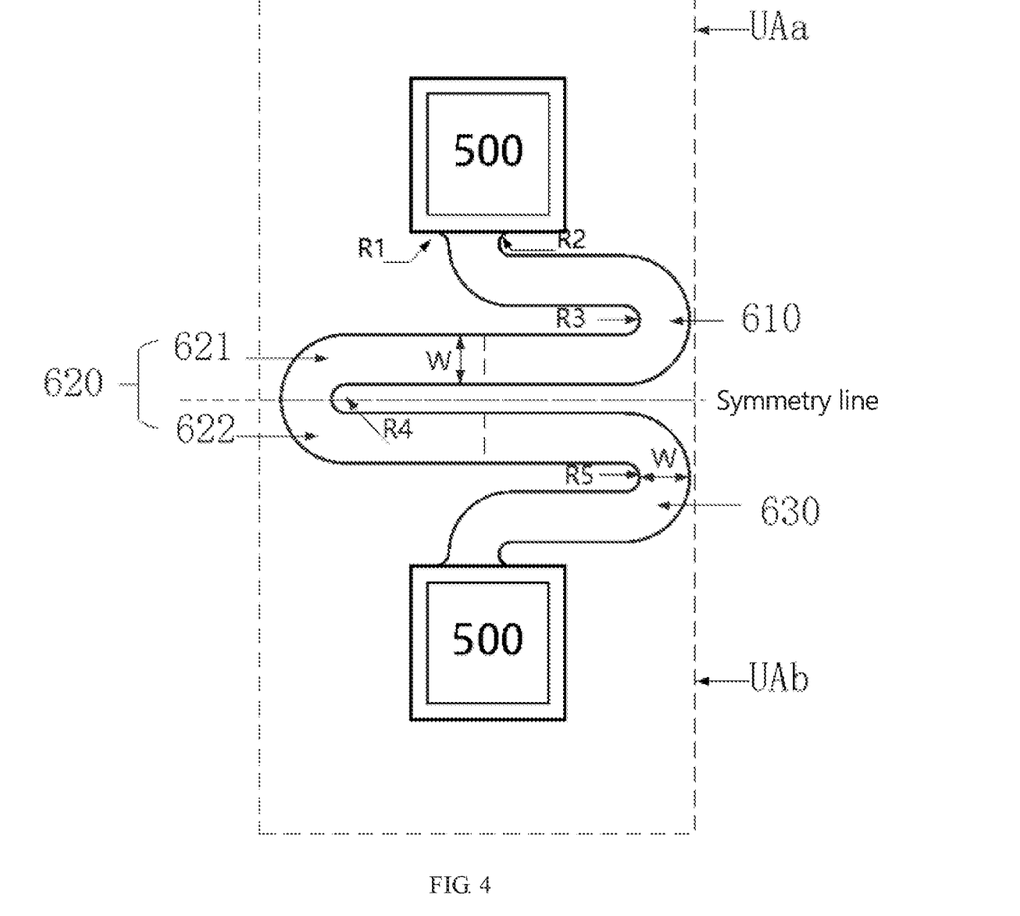
FIG. 4 is a schematic diagram of a first bending portion in an embodiment of the present application.

As shown in FIG. 4, FIG. 4 is a layout schematic diagram of a bridge connection of a main structure of a stretchable display unit. The adjacent unit area UAa, the unit area UAb, and the first bending structure 600 connecting the unit area UAa and the unit area UAb are selected. The first bending structure 600 comprises a first bending portion 610, a second bending portion 620, and a third bending portion 630. The first bending portion 610 is electrically connected to the unit area UAa, the third bending portion 630 is electrically connected to the unit area UAb, and the second bending portion 620 connects the first bending portion 610 and the third bending portion 630.

In some embodiments, the first bending portion 610 is connected to the unit area UAa by a first connecting portion, and the first connecting portion comprises a first chamfer R1 and a second chamfer R2. The first chamfer R1 and the second chamfer R2 are used to reduce a stress concentration phenomenon generated when the flexible display module is stretched. A curvature of the first chamfer R1 is the same as a curvature of the second chamfer R2, and a width of the first chamfer R1 and a width of the second chamfer R2 are from 10 microns to 20 microns.

In some embodiments, the first bending portion 610, the second bending portion 620, and the third bending portion 630 comprise at least two strips curved in two different directions. For example, the first bending portion 610 is connected to the second bending portion 620 in a clockwise direction, the second bending portion 620 is connected to the third bending portion 630 in a counterclockwise direction, and the third bending portion 630 is electrically connected to the unit area UAb in a clockwise direction.

In some embodiments, the first bending structure 600 is a strip structure with a uniform width, and the width of the first bending structure 600 is from 40 μm to 50 μm. A curvature of an inner edge and a curvature of an outer edge of the first bending structure 600 are the same, a curvature of an inner edge rotation angle R3 of the first bending portion 610 is the same as a curvature of an inner edge rotation angle R4 of the second bending portion 620, a width of the inner edge rotation angle R3 of the first bending portion 610 is the same as a width of the inner edge rotation angle R4 of the second bending portion 620, and the width of the inner edge rotation angle R3 of the first bending portion 610 and the width of the inner edge rotation angle R4 of the second bending portion 620 is from 10 microns to 20 microns.

In some embodiments, the first bending structure 600 is horizontally symmetrical along a symmetry line of the second bending portion 620. The second bending portion 620 comprises one half of the second bending portion 621 and the other half of the second bending portion 622, one half of the second bending portion 621 and the other half of the second bending portion 622 bisect the inner edge rotation angle R4 of the second bending portion 620. The curvature of the inner edge rotation angle R4 of the second bending portion 620 is the same as a curvature of an inner edge rotation angle R5 of the third bending portion 630, the width of the inner edge rotation angle R4 of the second bending portion 620 and a width of the inner edge rotation angle R5 of the third bending portion 630 are the same, and the width of the inner edge rotation angle R4 of the second bending portion 620 and the width of the inner edge rotation angle R5 of the third bending portion 630 are from 10 microns to 20 microns.

In some embodiments, the first bending structure 600 is symmetrical along a center of the first bending structure 600 in a vertical direction, and the adjacent unit area UAa and the unit area UAb connected in a vertical direction are symmetrical along a center line between the unit area UAa and the unit area UAb.

Since the curvature of the inner edge rotation angle R3 of the first bending portion 610, the curvature of the inner edge rotation angle R4 of the second bending portion 620, and the curvature of the inner edge rotation angle R5 of the third bending portion 630 are the same, and bending directions of the first bending portion 610 and the second bending portion 620 are opposite, the first bending structure 600 forms a micro-structure like a spring, which can stretch the two adjacent island structures 500 in the direction DR1 and the direction DR2. At the same time, the first bending structure 600 can also move in a direction perpendicular to the direction DR1 and the direction DR2, which effectively improves stretchability of the flexible display module.

Figure 5:
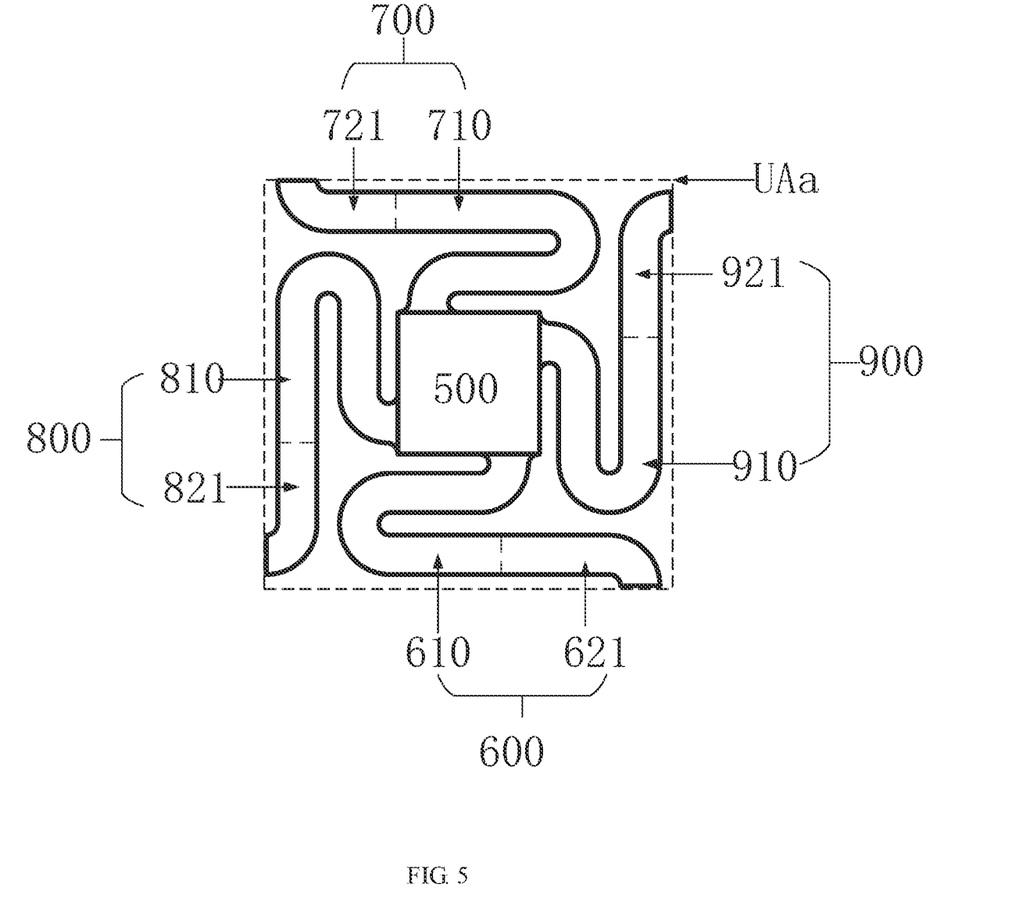
FIG. 5 is a layout schematic diagram of a stretchable display unit in an embodiment of the present application.

As shown in FIG. 5, one of the plurality of unit areas UAa is selected, and the unit area UAa comprises a half of the first bending structure 600, a half of a second bending structure 700 (comprising two bending portions 710 and 721), a half of a third bending structure 800 (comprising two bending portions 810 and 821), and a half of a fourth bending structure 900 (comprising two bending portions 910 and 921). Taking the first bending structure 600 as an example, the half of the first bending structure 600 comprises the first bending portion 610 and one half of the second bending portion 621, and the inner edge rotation angle of the half bending portion 621 is half of the inner edge rotation angle R3 of the first bending portion 610.

In some embodiments, a shape of the unit area UAa is square, and the unit area UAa comprises a first side, a second side, a third side, and a fourth side. The first side and the second side are oppositely arranged. The third side and the fourth side are oppositely arranged. The first bending structure 600 is connected to the first side of the island-shaped structure 500 by a first connecting portion, and the second bending structure 700 is connected to the second side of the island-shaped structure 500 by a second connecting portion, the third bending structure 800 is connected to the third side by a third connecting portion, and the fourth bending structure 900 is connected to the fourth side by a third connecting portion, wherein the first connecting portion and the second connecting portion are arranged on both sides of a center perpendicular of the island-shaped structure 500, and the third connecting portion and the fourth connecting portion are arranged on both sides of a symmetry axis of the island-shaped structure 500.

In some embodiments, the first connecting portion is disposed at one end of the first side close to the third side, the second connecting portion is disposed at one end of the second side close to the fourth side, the third connecting portion is disposed at one end of the third side away from the first side, and the fourth connecting portion is disposed at one end of the fourth side away from the second side.

Figure 6:
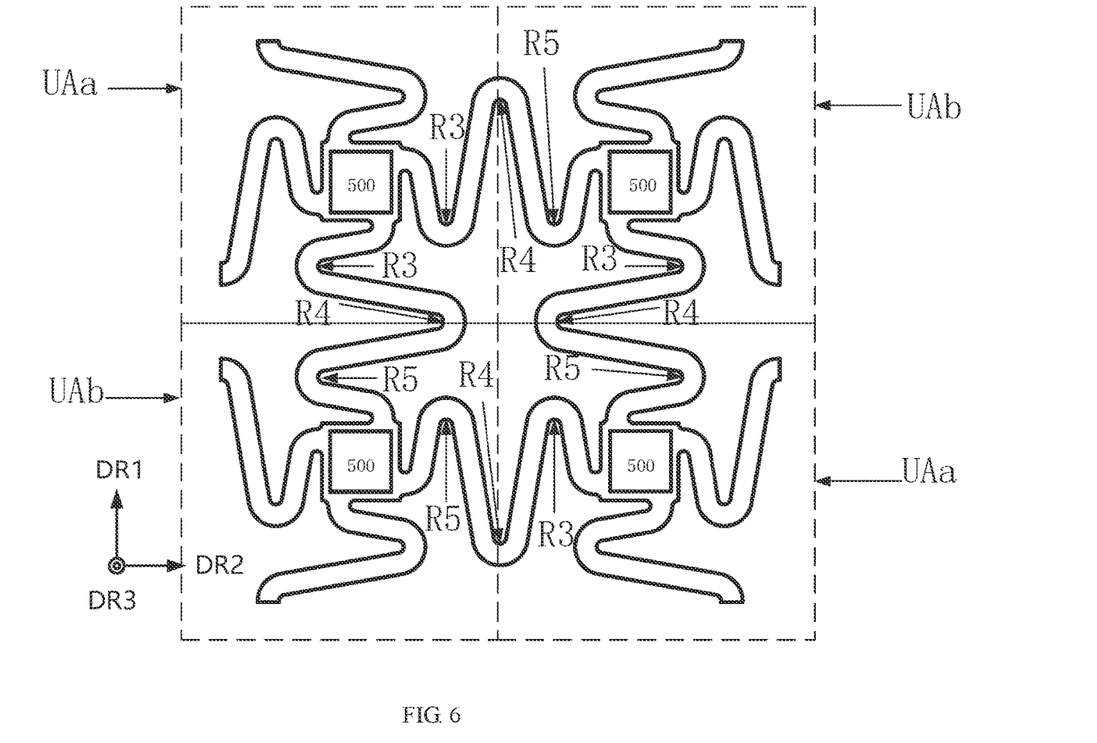
FIG. 6 is a planar layout schematic diagram of the display area of the flexible display module after stretching in an embodiment of the present application.

As shown in FIG. 6, FIG. 6 is a deformation schematic diagram of several island-shaped structures of the main structure of the stretchable display unit and their curved wiring structures under a state of external force tension: it can be understood that the flexible display module is stretched by applying force in the direction DR1 and the direction DR2 at the same time, and each of the curved wiring structures deforms in a direction of an external force. The curved wiring structures can be elastically deformed in a planar space in a form of a force similar to a spring, then an overall length changes; that is, in a corresponding force direction, each of the curved wiring structures is stretched and deformed, and the overall length of each of the bending wire structures becomes longer due to a tensile deformation. Since each of the curved wiring structures has three bending structures, when it is stretched, each of the three bending structures is deformed to different degrees at the same time, and each presents an open state to achieve an effect of coordinated stretching deformation at the same time; correspondingly, the entire flexible display module is stretched under an effect of the external force, and the plurality of island-shaped structures and the bending structures are stretched and deformed in the direction DR1 and the direction DR2 in a manner shown above, then an overall accumulation can reach a certain deformation, so as to reach a good stretchable mechanical property.

Figure 7:
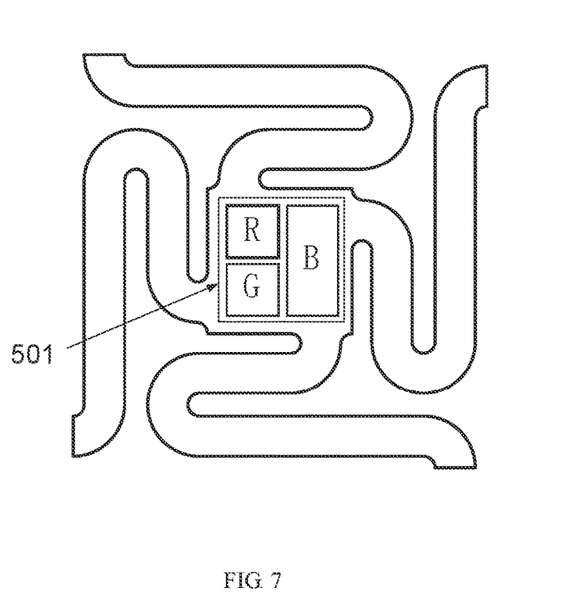
FIG. 7 is a distribution schematic diagram of a pixel unit corresponding to an island-shaped structure of the flexible display module in an embodiment of the present application.

FIG. 7 is a distribution schematic diagram of the pixel unit corresponding to an island-shaped structure. The pixel unit 501 comprises a first color sub-pixel R, a second color sub-pixel G, and a third color sub-pixel B. An area of the third color sub-pixel B is larger than that of a sum of an area of the first color sub-pixel R and an area of the second color sub-pixel B. Among them, the pixel unit 501 also comprises a red sub-pixel, a blue sub-pixel, and a green sub-pixel.

In some embodiments, a shape of each color sub-pixel can comprise, but is not limited to, square, rhombus, rectangle, circle, polygon, etc.

Figure 8:
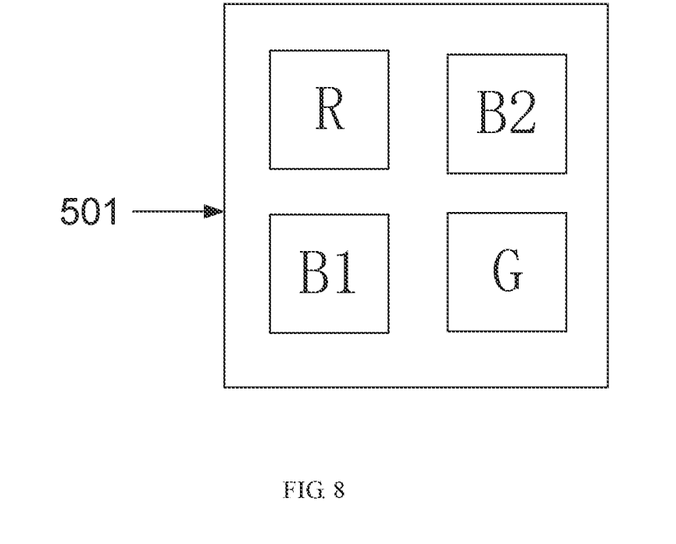
FIG. 8 is a pixel arrangement schematic diagram of the pixel unit of the flexible display module in an embodiment of the present application.

FIG. 8 is a pixel arrangement schematic diagram of the pixel unit corresponding to the island-shaped structure. The pixel unit 501 comprises a first sub-pixel R, a second sub-pixel G, a third sub-pixel B1, and a fourth sub-pixel B2. The first sub-pixel R corresponds to the red sub-pixel, the second sub-pixel G corresponds to the green sub-pixel, the third sub-pixel B1 and the fourth sub-pixel correspond to the blue sub-pixel, and an area of the first color sub-pixel R, an area of the second color sub-pixel G, an area of the third sub-pixel B1 and an area of the fourth sub-pixel B2 are the same, so that a light-emitting area of blue pixels can be larger than a light-emitting area of red pixels and green pixels respectively.

In some embodiments, shapes of the first sub-pixel R and the second sub-pixel G are square, and shapes of the third sub-pixel B1 and the fourth sub-pixel B2 are rectangular.

In some embodiments, the shapes of the first sub-pixel R, the second sub-pixel G, the third sub-pixel B1, and the fourth sub-pixel B2 are square, and the first sub-pixel R, the second sub-pixel G, the third sub-pixel B1 and the fourth sub-pixel B2 can be arranged in an alternating manner, wherein the blue pixels can be arranged in a mirrored manner.

In some embodiments, the third sub-pixel B1 and the fourth sub-pixel B2 can emit blue light of different wavelengths, and the third sub-pixel B1 and the fourth sub-pixel B2 can be arranged in a mirror symmetrical manner.

Figure 9:
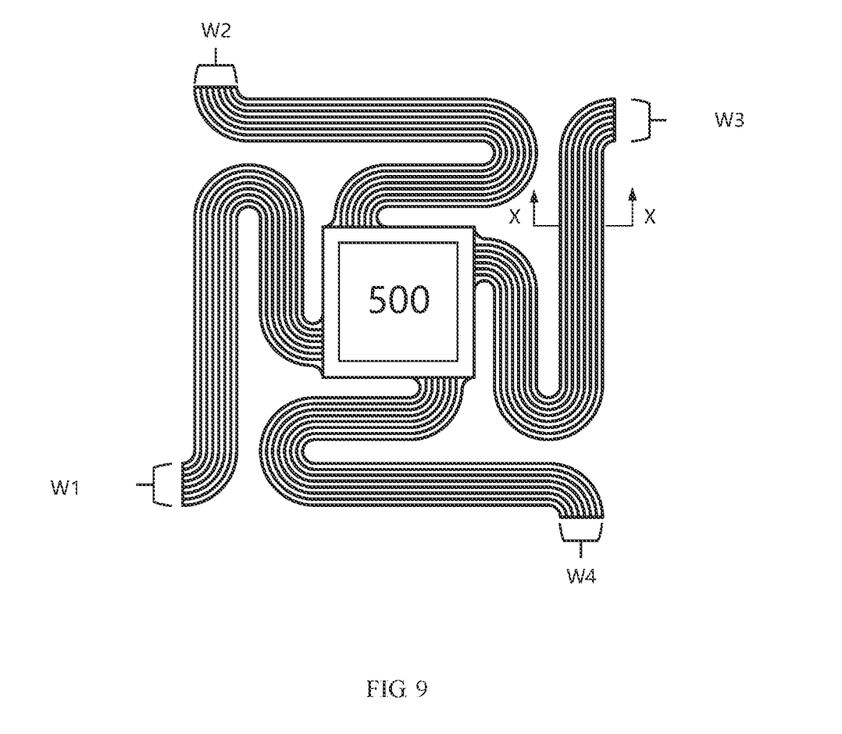
FIG. 9 is a planar arrangement schematic diagram of metal wires in an embodiment of the present application.

FIG. 9 is a planar arrangement schematic diagram of metal wires in a wiring area of the main structure of the island-shaped structure, and it also shows a position of a line XX which used as a section line of a cross-sectional schematic diagram of the metal lines. The metal wires are distributed in a main part of the wiring area and parallel to each other. The entire island-shaped structure is arranged with four metal wires, and the four metal wires are a first metal wire 1, a second metal wire W2, a third metal wire W3, and a fourth metal wire W4. The first metal wire W1, the second metal wire W2, the third metal wire W3, and the fourth metal wire W4 comprise but are not limited to data lines, gate lines, driving voltage lines, and voltage transmission lines.

Figure 10:
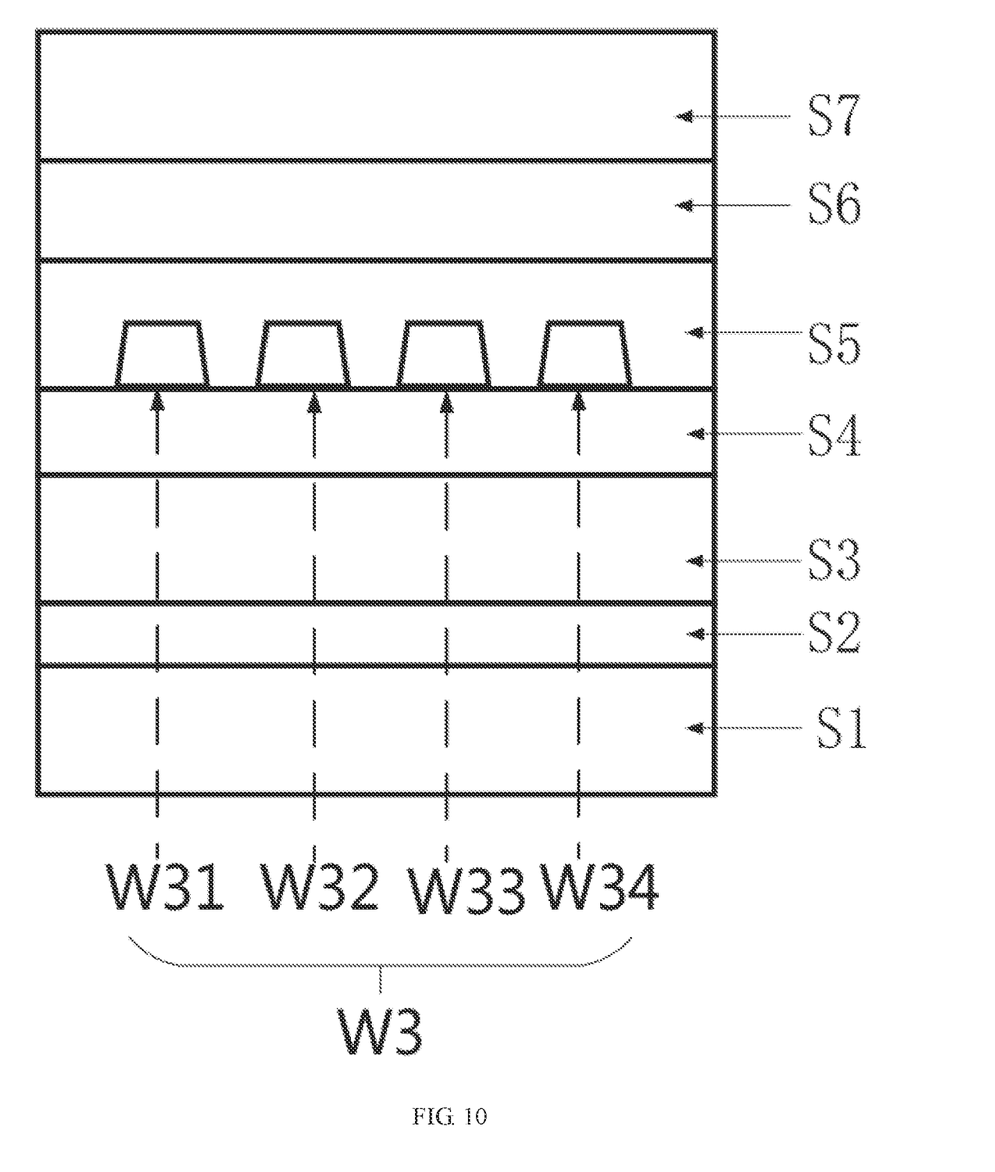
FIG. 10 is a cross-sectional schematic diagram of a bending area along a line X-X in an embodiment of the present application.

FIG. 10 is a cross-sectional schematic diagram of the wiring area along the line XX, the wiring area comprises a first flexible substrate S1; a buffer layer S2 disposed on one side of the first flexible substrate S1; a second flexible substrate S3 disposed on one side of the buffer layer S2 away from the first flexible substrate S1; a first packaging layer S4 disposed on one side of the second flexible substrate S3 away from the buffer layer S2; a wiring substrate S5 disposed on one side of the first packaging layer S4 away from the second flexible substrate S3; a spacer S6 disposed on one side of the wiring substrate S5 away from the first packaging layer S4; a second packaging layer S7 disposed on one side of the spacer S6 away from the wiring substrate S5; wherein at least four metal lines are provided within the wiring substrate S5, and the third metal wire W3 comprises a first metal line W31, a second metal line W32, a third metal line W33, and a fourth metal line W34. The above four metal lines are arranged in parallel and equidistantly. The third metal wire W3 comprises but is not limited to a data line, a gate line, a driving voltage line, and a voltage transmission line.

The first flexible substrate S1 and the second flexible substrate S3 can be made of one of urethane rubber, acrylic and silicon rubber, which have good stretchability; the buffer layer S2 is used to reduce a risk of crack caused by a deformation of the wiring area, if the flexible substrate S1 has a crack, then the crack of the flexible substrate S1 cannot be conducted to the second flexible substrate S3 due to an effect of the buffer layer S2. The wiring substrate S5 comprises an organic insulating material, which comprise but is not limited to polyimide-based polymer, polypropylene polymer, siloxane polymer, fluorine-containing polymer, or benzene-containing polymer. The spacer S6 also plays a role in isolating crack and reducing a risk of fracture. After testing, a resistance of the third metal wire W3 will not change within a preset stretching degree.

A purpose of the implementation of the present application is to design a flexible, stretchable, and retractable display device, which can realize a characteristic of stretch deformation along three directions in space. When the flexible display module is stretched in a state of not less than a preset elongation, a resistance of the metal wires between the adjacent pixel units does not change significantly, a display brightness remains basically unchanged, and a screen can be freely restored to its original state, thereby achieving a characteristic of a retractable flexible display. Through the implementation of the present application, it provides technical supports and solutions for fields of a flexible wearable display, a vehicle display, and a flexible medical display.

In the above-mentioned embodiments, the description of each embodiment has its own focus. For parts that are not described in detail in an embodiment, reference may be made to related descriptions of other embodiments.

The above is a detailed introduction to the flexible display module and the display device provided by the embodiments of the present application. Specific examples are used in this article to explain principles and implementations of the present application. The description of the above embodiments is only used to help understanding the technical solutions of the present application and its core ideas; those of skilled in the art should understand that: they can still modify the technical solutions described in the foregoing embodiments, or equivalently replace some of the technical features; and these modifications or replacements, does not cause an essence of the corresponding technical solutions to deviate from a scope of the technical solutions of the embodiments of the present application.

What is claimed is:

1. A flexible display module, wherein a display area of the flexible display module comprises:
    a plurality of island-shaped structures, wherein each of the island-shaped structures is provided with a pixel unit, and the plurality of island-shaped structures are separated from each other and arranged in a matrix; and
    a plurality of bending structures, wherein each of the bending structures comprises a plurality of metal lines electrically connected to the pixel unit, and the plurality of bending structures connect adjacent island-shaped structures;
    wherein a first bending structure of the plurality of bending structures comprises at least three bending portions, the first bending structure comprises at least two bending directions, and one end of the first bending structure connected to each of the adjacent island-shaped structures is disposed on one end of one side of corresponding island-shaped structures;
    wherein each of the bending structures comprises:
    a first flexible substrate;
    a buffer layer disposed on one side of the first flexible substrate;
    a second flexible substrate disposed on one side of the buffer layer away from the first flexible substrate;
    a first packaging layer disposed on one side of the second flexible substrate away from the buffer layer;
    a wiring substrate disposed on one side of the first packaging layer away from the second flexible substrate;
    a spacer disposed on one side of the wiring substrate away from the first packaging layer; and
    a second packaging layer disposed on one side of the spacer away from the wiring substrate;
    wherein at least four of the metal lines are provided within the wiring substrate, and the at least four metal lines are arranged in parallel and equidistantly.

2. The flexible display module according to claim 1, wherein the three bending portions are a first bending portion, a second bending portion, and a third bending portion; one end of the first bending portion is connected to a first island-shaped structure electrically; another end of the first bending portion is electrically connected to one end of the second bending portion; another end of the second bending portion is electrically connected to one end of the third bending portion; another end of the third bending portion is electrically connected to a second island-shaped structure; and the first island-shaped structure is adjacent to the second island-shaped structure;
    wherein a bending direction of the first bending portion and a bending direction of the second bending portion are different.

3. The flexible display module according to claim 2, wherein the bending direction of the first bending portion is opposite to the bending direction of the second bending portion.

4. The flexible display module according to claim 2, wherein a curvature of the first bending portion is same as a curvature of the second bending portion.

5. The flexible display module according to claim 2, wherein the first bending portion and the third bending portion are symmetrical along a symmetry axis of the first bending structure.

6. The flexible display module according to claim 1, wherein each of the island-shaped structures comprises a first side, a second side, a third side, and a fourth side, wherein the first side and the second side are oppositely arranged, and the third side and the fourth side are oppositely arranged;
    the first bending structure is connected to the first side of each of the adjacent island-shaped structures by a first connecting portion, the plurality of bending structures further comprise a second bending structure, and the second bending structure is connected to the second side of each of the adjacent island-shaped structures by a second connecting portion; and
    the first connecting portion is disposed at one end of the first side close to the third side, and the second connecting portion is disposed at one end of the second side close to the fourth side.

7. The flexible display module according to claim 6, wherein the plurality of bending structures further comprise a third bending structure and a fourth bending structure, and the third bending structure is connected to the third side by a third connecting portion, the fourth bending structure is connected to the fourth side by a fourth connecting portion, the third connecting portion is disposed at one end of the third side away from the first side, and a fourth connecting portion is disposed at one end of the fourth side away from the second side.

8. The flexible display module according to claim 7, wherein the first side, the second side, the third side, and the fourth side of each of the island-shaped structures form a square; and the first bending structure, the second bending structure, the third bending structure, and the fourth bending structure are disposed symmetrically around a center of the square.

9. The flexible display module according to claim 6, wherein the first bending portion of the first bending structure is away from one end of the first side close to the third side, and the second bending portion of the first bending structure is close to one end of the first side close to the third side.

10. The flexible display module according to claim 6, wherein the first connecting portion comprises a first chamfer and a second chamfer that are disposed oppositely, and a curvature of the first chamfer is same as a curvature of the second chamfer.

11. The flexible display module according to claim 1, wherein the pixel unit comprises a first color sub-pixel, a second color sub-pixel, and a third color sub-pixel, and an area of the third color sub-pixel is larger than that of a sum of an area of the first color sub-pixel and an area of the second color sub-pixel.

12. The flexible display module according to claim 1, wherein the pixel unit comprises a first sub-pixel, a second sub-pixel, a third sub-pixel, and a fourth sub-pixel, and the first sub-pixel corresponds to the first color sub-pixel, the second sub-pixel corresponds to the second color sub-pixel, and the third sub-pixel and the fourth sub-pixel correspond to the third color sub-pixel.

13. The flexible display module according to claim 1, wherein the metal lines comprise at least data lines, gate lines, driving voltage lines, and voltage transmission lines.

14. A display device, wherein a display area of the flexible display module comprises:
a plurality of island-shaped structures, wherein each of the island-shaped structures is provided with a pixel unit, and the plurality of island-shaped structures are separated from each other and arranged in a matrix; and
a plurality of bending structures, wherein each of the bending structures comprises a plurality of metal lines electrically connected to the pixel unit, and the plurality of bending structures connect the adjacent island-shaped structures;
wherein a first bending structure of the plurality of bending structures comprises at least three bending portions, the first bending structure comprises at least two bending directions, and one end of the first bending structure connected to each of the adjacent island-shaped structures is disposed on one end of one side of corresponding island-shaped structures;
wherein each of the bending structures comprises:
a first flexible substrate;
a buffer layer disposed on one side of the first flexible substrate;
a second flexible substrate disposed on one side of the buffer layer away from the first flexible substrate;
a first packaging layer disposed on one side of the second flexible substrate away from the buffer layer;
a wiring substrate disposed on one side of the first packaging layer away from the second flexible substrate;
a spacer disposed on one side of the wiring substrate away from the first packaging layer; and
a second packaging layer disposed on one side of the spacer away from the wiring substrate;
wherein at least four of the metal lines are provided within the wiring substrate, and the at least four metal lines are arranged in parallel and equidistantly.

15. The display device according to claim 14, wherein the three bending portions are a first bending portion, a second bending portion, and a third bending portion; and one end of the first bending portion is connected to a first island-shaped structure electrically; another end of the first bending portion is electrically connected to one end of the second bending portion; another end of the second bending portion is electrically connected to one end of the third bending portion; another end of the third bending portion is electrically connected to a second island-shaped structure; and the first island-shaped structure is adjacent to the second island-shaped structure;
wherein a bending direction of the first bending portion and a bending direction of the second bending portion are different.

16. The display device according to claim 14, wherein each of the island-shaped structures comprises a first side, a second side, a third side, and a fourth side, wherein the first side and the second side are oppositely arranged, and the third side and the fourth side are oppositely arranged;
the first bending structure is connected to the first side of each of the adjacent island-shaped structures by a first connecting portion, the plurality of bending structures further comprise a second bending structure, and the second bending structure is connected to the second side of each of the adjacent island-shaped structures by a second connecting portion; and
the first connecting portion is disposed at one end of the first side close to the third side, and the second connecting portion is disposed at one end of the second side close to the fourth side.

17. The display device according to claim 16, wherein the plurality of bending structures further comprise a third bending structure and a fourth bending structure, the third bending structure is connected to the third side by a third connecting portion, the fourth bending structure is connected to the fourth side by a fourth connecting portion, the third connecting portion is disposed at one end of the third side away from the first side, and the fourth connecting portion is disposed at one end of the fourth side away from the second side.

18. The display device according to claim 17, wherein the first side, the second side, the third side, and the fourth side of each of the island-shaped structures form a square, and the first bending structure, the second bending structure, the third bending structure, and the fourth bending structure are disposed symmetrically around a center of the square.

19. The display device according to claim 16, wherein the first bending portion of the first bending structure is away from one end of the first side close to the third side, and the second bending portion of the first bending structure is close to one end of the first side close to the third side.

* * * * *